INVENTOR
LOWELL E. HOXIE
BY
Kane, Dalsimer & Kane
ATTORNEYS

United States Patent Office 3,377,317
Patented Apr. 9, 1968

3,377,317
FLAME RESISTANT COMPOSITIONS AND METHODS OF MAKING SAME, SAID COMPOSITIONS COMPRISING THE REACTION PRODUCT OF A PHENOL-ALDEHYDE RESOL AND A PHOSPHORIC ACID ESTER
Lowell E. Hoxie, 205 Ridge Road,
Rutherford, N.J. 07070
Filed Aug. 5, 1964, Ser. No. 387,674
2 Claims. (Cl. 260—59)

ABSTRACT OF THE DISCLOSURE

A flame retardant, flame resistant resinous composition is disclosed comprising the reaction product of a phosphoric acid ester and a phenolic aldehyde resol.

This invention relates to flame resistant compositions and a method of making the same and more particularly, to improved resinous compositions for use as surface coatings, impregnating agents, cast moldings and the like, for application to various manufactured articles which after application protect the articles from fire and retard propagation of flames.

Many types of resinous compositions have been used as flame retardant and flame resistant coatings for base materials. Although these compositions do retard the propagation of flame and resist burning to some degree, the application of a direct flame for any extended period of time to the protective coating may result in undesirable afterflame, afterglow, flaking, flameless decomposition and charring of the base material. Phenol formaldehyde resins when modified with an adjuvant such as halide phosphate esters, or nitrogen-containing compounds are typical compositions used for this purpose but are generally subject to and limited by the above disadvantages.

It is a primary object of my invention to provide resinous flame resistant and flame retardant compositions for the protection of manufactured articles which when subjected to direct flame substantially eliminate the destructive afterflame, afterglow and flaking heretofore encountered and which minimize the flameless decomposition and charring of the base material.

It is a further object of my invention to provide resinous compositions which may be cast molded or applied to metal surfaces to substantially reduce the conduction of heat therethrough.

Another object of my invention is to provide, by a simple method, resinous compositions from inexpensive, readily available materials, which compositions before application are water-soluble and fusible but which after curing form an insoluble, infusible film which renders coated base materials flame resistant.

My invention contemplates the preparation of resinous compositions having improved flame retardant and flame resistant characteristics comprising the reaction product of an organic phosphorus acidic ester and a phenolic aldehyde resol. The liquid organic phosphorous acidic ester and phenolic aldehyde resol complex so formed may then, upon application, be either air, heat or chemically cured to form the improved flame resistant infusible, insoluble solid or film. The organic phosphorus acidic esters are formed by reacting a polybasic phosphorus acid with an alcohol, either monohydric or polyhydric. I have also found that these acidic esters of alcohol and a polybasic phosphorus acid may be used alone as flame retarding materials, and as plasticizers, although they are not as effective as the resinous composition indicated above.

Organic phosphorus acidic esters may be prepared by reacting a polybasic phosphorus acid such as orthophosphoric acid and an alcohol either monohydric such as ethyl, amyl, butyl or diacetone or polyhydric such as glycerol, polyglycerol, glycol, polyglycol, pentaerythritol, sorbitol or mannitol.

Resinous compositions comprising organic phosphorus acidic ester and phenolic aldehyde resol complexes may be prepared by reacting the organic phosphorus acidic ester with a phenolic aldehyde resol which may be the condensation product of phenol, cresol or xylenol and an aldehyde such as acetaldehyde, formaldehyde, paraformaldehyde or benzaldehyde. In a preferred form, my improved flame retardant and flame resistant composition comprises the polymeric complex resulting from the reaction of a phenolic aldehyde resol such as phenol formaldehyde and an organic phosphorus acidic ester which is in turn the reaction product of an alcohol such as ethanol or glycerol and a polybasic phosphorus acid such as orthophosphoric acid.

When preparing these resinous compositions, proportions of the ingredients may vary. When forming an organic phosphorous acidic ester, I have found that proportions of one part by mole of a polybasic phosphorus acid to at least one part by mole alcohol and preferably one part by mole of a polybasic phosphorus acid to one to four parts by mole alcohol are satisfactory. When forming resinous compositions of the ester and resol, I have found that proportions of one part by weight of an organic phosphorus acidic ester to at least two parts by weight of a phenolic aldehyde resol but preferably one part by weight of an organic phosphorus acidic ester to between two and four parts by weight of a phenolic aldehyde resol may be used. Reaction periods for preparing the organic phosphorus acidic esters will vary according to the proportions of the reactants, and temperatures and pressures used in formation.

When preparing resinous compositions which have improved flame retardant and flame resistant characteristics, the organic phosphorus acidic ester is initially prepared by reacting a polybasic phosphorus acid with either a monohydric or polyhydric alcohol in proportions indicated above. Advantageously, heat and reduced pressure are applied to the reactants throughout the reaction period and thereafter the heat is removed and the reduced pressure is maintained until the reactants are at room temperature.

The formed organic phosphorus acidic ester is mixed with a phenolic aldehyde resol in proportions indicated above. An exothermic condensation reaction is allowed to proceed under constant stirring thus forming a soluble, fusible, liquid organic phosphorus acidic ester and phenolic aldehyde resol complex. The prepared liquid complex due to its acidic characteristics, may be air cured, cured by heating or may be rapidly cured by adding chemical hardeners such as hydrochloric acid which hasten the curing process, thereby forming an infusible, insoluble flame resistant solid or film.

In the accompanying drawings the figures are graphical representations of the infra red spectra of specific and illustrative flame retardant reaction products described in the examples below in which.

The following examples illustrate preparations of specific reaction products of monohydric and polyhydric alcohol phosphorus acidic esters and phenolic aldehyde resols with specific references to the drawings:

EXAMPLE I

Figure 1:
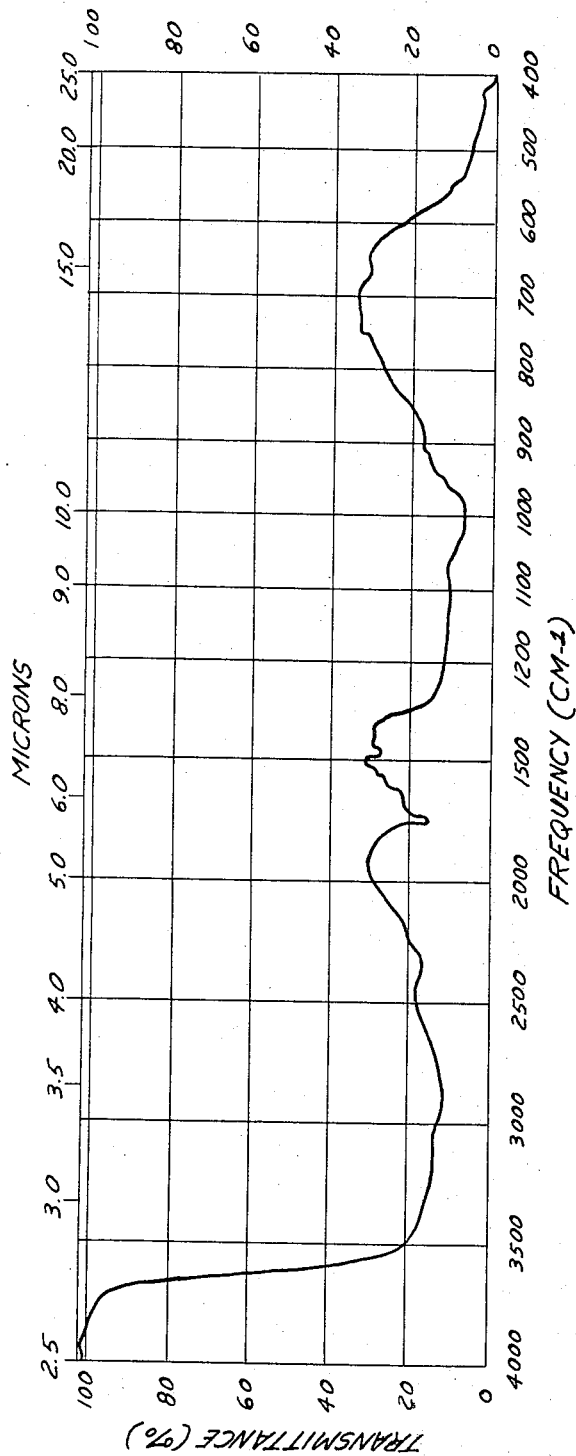
FIG. 1 is the infra red spectrum of glycerol phosphate acidic ester.

One mole of orthophosphoric acid is mixed with two moles of chemically pure glycerol and the mixture is heated gradually so that the temperature of the reactants is raised from room temperature to approximately 80 to 100° C. After approximately 10 minutes, the mixture is subjected to a vacuum of approximately one-half atmosphere which is maintained for the remainder of the reaction period. The duration of the reaction period is approximately 45 minutes, after which the heat is removed and the vacuum is continued until the formed glycerol phosphate acidic ester is at ambient temperatures. 23.5 ml. of water are emitted during the condensation reaction period. The product formed is a glycerol phosphate acidic ester which is a viscous solution, pale yellow in color and having an infra red spectrum as shown in FIG. 1.

Figure 2:
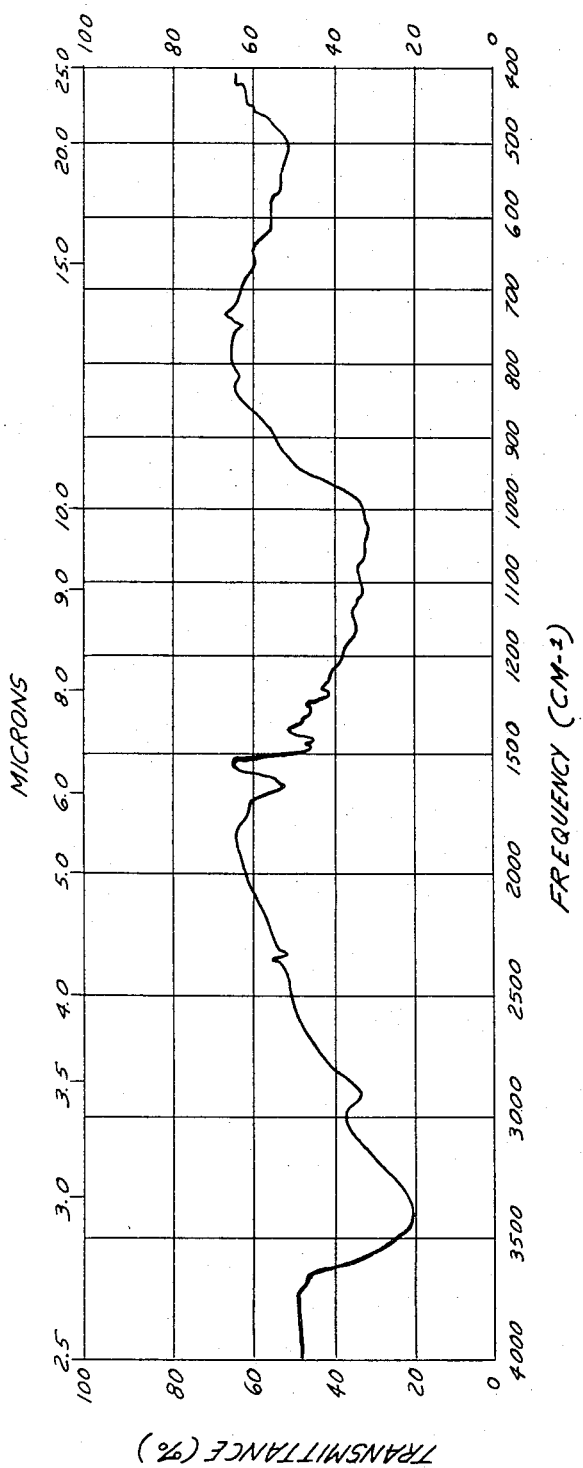
FIG. 2 is the infra red spectrum of glycerol phosphate acidic ester and phenol formaldehyde resol complex.

One part by weight of the so-formed acidic ester is mixed with four parts by weight of phenol formaldehyde resol and the mixture agitated by constant stirring in which an exothermic condensation reaction takes place. The glycerol phosphate acidic ester and phenol formaldehyde resol complex formed is shown by the infra red spectrum of FIG. 2. This prepared complex is water-soluble, fusible, liquid and may be cast molded or coated on suitable surfaces such as wood or metal. When air, heat, or chemically cured, the complex hardens to a reddish-pink, insoluble, infusible, flame resistant solid or film.

The glycerol phosphate acidic ester may be used alone as an effective flame resistant compound and as a plasticizer in other compounds where it imparts its flame resistant properties.

EXAMPLE II

Figure 3:
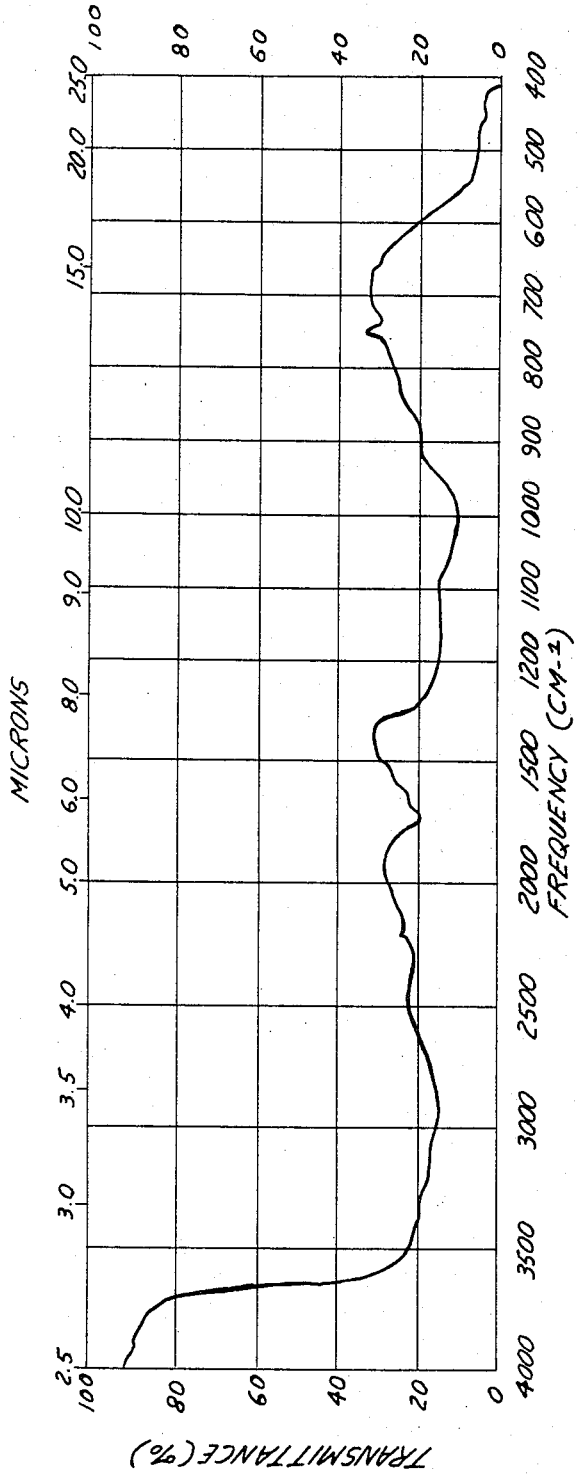
FIG. 3 is the infra red spectrum of ethyl phosphate acidic ester.

One mole of orthophosphoric acid is mixed with one mole of ethyl alcohol and the mixture is heated gradually so that the temperature of the reactants is raised from room temperature to approximately 85° C. After approximately 10 minutes, the mixture is subjected to a vacuum of approximately two-thirds atmosphere for the remainder of the reaction period. The duration of the reaction period is approximately 30 minutes after which the heat is removed and the vacuum is continued until the formed ethyl phosphate acidic ester is at ambient temperatures. 30.8 ml. of water are formed and removed during the reaction. The resulting ethyl phosphate acidic ester is a viscous, amber colored liquid and has an infra red spectrum as shown in FIG. 3.

Figure 4:
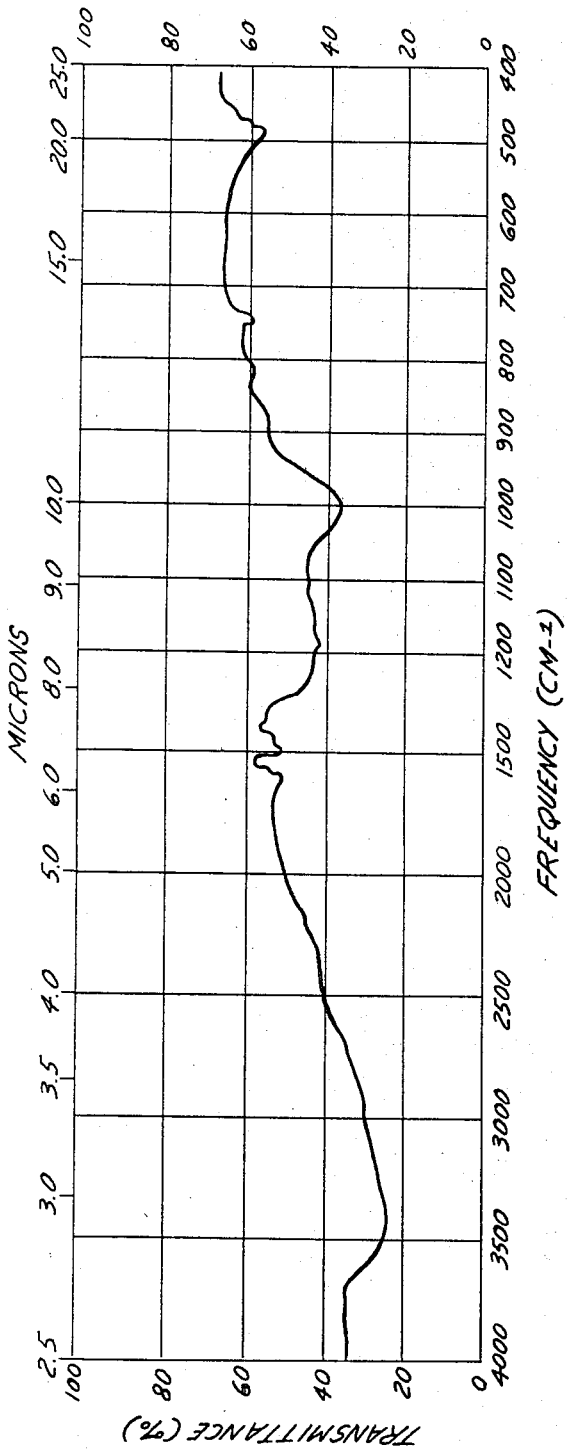
FIG. 4 is the infra red spectrum of ethyl phosphate acidic ester and phenol formaldehyde resol complex.

One part by weight of the so-formed acidic ester is mixed with four parts by weight of phenol formaldehyde resol and the reactants are agitated by constant stirring in which an exothermic condensation reaction takes place and the water of condensation is removed. The ethyl phosphate acidic ester and phenol formaldehyde resol complex formed is shown by the infra red spectrum of FIG. 4. The thus formed liquid complex may be applied to various manufactured products and cured as described in Example I.

The ethyl phosphate acidic ester may also be used effectively alone and as a plasticizer in other compounds as the ester described in Example I.

The following examples illustrate practical applications of the resinous compositions formed as in Examples I and II.

EXAMPLE III

The glycerol phosphate acidic ester and phenol formaldehyde resol complex prepared as in Example I, is coated on the surface of a soft wood ⅛" thick and 10" long by spraying, dipping or brushing and allowed to air cure for 30 to 120 minutes at ambient temperatures. The coated wood article is exposed to the flame of a propane torch for 10 seconds and removed. The resinous coating does not sustain combustion, no afterflame or afterglow occurs and charring is restricted to the point of impingement of the flame. The ethyl phosphate acidic ester and phenol formaldehyde resol complex prepared as in Example II is tested as above with similar results.

EXAMPLE IV

The glycerol phosphate acidic ester and phenol formaldehyde resol complex prepared as in Example I is coated on copper tubing ⅛" wall thickness and 2" long, either by spraying, dipping or brushing and allowed to air cure for 30 to 120 minutes. The copper surface is prepared by rubbing the surface with steel wool to remove all dirt and film prior to coating. The coated copper surface is exposed at one end to the flame of a propane torch for 10 seconds and removed. The temperature of the coated copper tube at the other end remains substantially at ambient temperatures. The coated resinous surface shows no adverse effects due to the impingement of the flame and remains bonded to the copper surface. The ethyl phosphate acidic ester and phenol formaldehyde resol complex prepared as in Example II is tested as above with similar results.

EXAMPLE V

The glycerol phosphate acidic ester and phenol formaldehyde resol complex prepared as in Example I is cast molded in the form of a bar ¼" thick, 3" long and chemically cured by adding 5 drops of concentrated hydrochloric acid. The bar exhibits a reddish-brown color after curing. The cured cast molded bar is exposed to the flame of a Bunsen burner for approximately 10 minutes. After the flame is removed, the bar exhibits no deformation, however at the point of impingement of the flame, a slight localized discoloration occurs but the discolored area is smooth and has a glass-like finish. Ethyl phosphate acidic ester and phenol formaldehyde resol complex prepared as in Example II is tested as above with similar results.

The curing process of polyhydric or monohydric alcohol phosphorus acidic ester and phenolic aldehyde resol complexes exhibits three stages of curing similar to phenolic aldehyde resols. Initially, when the polyhydric or monohydric alcohol phosphorus acidic ester is added to the phenolic aldehyde resol, an exothermic condensation reaction occurs in which a complex high molecular polynuclear compound is formed. This first stage is believed to be a condensation reaction which occurs between the methylol groups of the phenolic aldehyde and the temperature of the reaction should not exceed approximately 170° C.

The second stage occurs when the polyhydric or monohydric alcohol phosphorus acidic ester and phenol aldehyde resol complex is coated on a surface of wood or metal and allowed to air or heat cure. When heat curing to the second stage, the temperature of the reaction should not exceed approximately 210° C. Curing of such a resin as indicated above need not take place at such elevated temperatures, but may be air cured at ambient temperatures. It is believed that the acid pH inherent in the organic phosphorus acidic ester will partially catalyze air curing of the formed complex to the second stage. Generally, hardeners are added to a plasticizer to effect a chemical cure for such resins. These hardeners are acids dissolved in glycerine or glycols. Since the pH of the organic phosphorus acidic ester and phenol aldehyde resol complex is below 7, the use of additional acids as hardeners is not necessary to effect a chemical cure to the second stage and the formed resin may therefore be air cured.

The third stage occurs when the temperature of the resinous complex is increased to above approximately 210° C. or in which a chemical cure has been effected. Where the resinous complex has been coated on either metal or wood and has become nicked by impact or scratched by a sharp implement, the resinous surface will become sealed when subjected to the third curing stage. Thus, if a flame is impinged on such an area, the base material will not be directly affected thereby, due to the flowing in of the resinous surface. When the polyhydric or monohydric alcohol phosphorus acidic ester and phenolic aldehyde resol complexes are subjected to a chemical cure, the composition is cured directly to the third stage. Such chemical cures may be effected by the addition of acids often referred to as hardeners. Such hardeners for example are hydrochloric or phosphoric acids in glycerine or glycols. The primary reaction of such a curing process of a resol is the formation of further methylene bridges in the phenolic aldehyde resol.

It has been observed that after the resinous coating has been cured through the second stage either by air curing at ambient temperatures or by heat curing at temperatures of less than approximately 210° C. and the resinous coating is subjected to temperatures in excess of 210° C., thereby effecting a third stage cure, a further condensation reaction occurs in which small amounts of phosphoric acid and water are released. It is to be noted when such a coating is applied to an adsorbent surface, the condensation products penetrate the adsorbent surface though not adversely affecting the base material or the resinous coating.

It has been found that when employing monohydric or polyhydric alcohol phosphorus acidic ester and phenolic aldehyde resol complexes, flame retardant properties are greatly enhanced and are superior to flame retardants in general use. Such resins as disclosed herein exhibit desirable qualities of toughness, high molecular weight, low bulk density and machinability, and may be cured either by the action of air or heat or by employing a chemical hardener. Further, when air and heat cures are employed under the proper conditions as set forth above, the third stage of the cure does not occur until an excess of heat is employed. The flame retardants in general use do not exhibit these properties. It has also been found that cast molded products made from such resins have excellent dielectric properties. Such resins exhibit exceptional stability when subjected to high heat and are therefore applicable to many uses in which a material must be selected to withstand such heat and maintain its original configuration.

Further, no flame decomposition of the base material or resin occurs under direct contact with flame and no after flame, or afterglow, or noticeable burning results after the flame is removed. Charring and discoloration are localized to the contact area with no loss of shape. When the flame is removed, the flameless decomposition of the base material is stopped within a few seconds. It has been observed that the flame retardant characteristics of such resins increase as the thickness of the resin coating is increased.

Monohydric or polyhydric alcohol phosphorus acidic ester and phenolic aldehyde resol complexes may be used as adjuvants to other products when in the resol or first stage of curing. They may be incorporated in paint or may have fillers and other coloring materials added thereto such as talc, rottenstone, wood flour, asbestos, iron oxide, chromium oxide or the like.

Modifications may be made in the illustrated and described embodiments of my invention without departing from the invention as set forth in the accompanying claims.

I claim:
1. A water soluble, fusible liquid resinous composition having improved flame retardant and flame resistant characteristics consisting essentially of 1 part by weight of alkyl phosphate acid alcohol ester formed by reacting 1 mole of orthophosphoric acid and 1 mole of a monohydric alcohol selected from the group consisting of ethyl alcohol, butyl alcohol and amyl alcohol at a temperature of from about 80 to 100° C. while subjected to a vacuum of about one-half atmosphere, and reacted with 4 parts by weight of a phenol formaldehyde resol to form an alkyl phosphate acid alcohol ester and phenol formaldehyde resol complex having the infrared spectrum of FIG. 4.

2. A method of preparing a water soluble, fusible liquid resinous composition having improved flame retardant and flame resistant characteristics consisting essentially of forming the reaction product of a phosphoric acid alkyl alcohol ester and a phenolic aldehyde resol, forming the phosphate acid alkyl alcohol ester by reacting 1 mole of orthophosphoric acid with at least 1 mole of an alkyl alcohol, the alcohol being selected from the group consisting of ethyl alcohol, butyl alcohol and amyl alcohol, while maintaining a controlled temperature of approximately 80 to 100° C. and a pressure of less than ½ atmosphere, and reacting said acid ester with a phenol aldehyde resol in the proportion of approximately 1 part by weight of the acid ester and at least 2 parts by weight of the resol to form a phosphoric acid alkyl alcohol ester and a phenol aldehyde resol complex.

References Cited

UNITED STATES PATENTS

| | | | |
|---|---|---|---|
| 919,067 | 2/1963 | Hooker | 260—59 |
| 1,978,821 | 10/1934 | Schmidt | 260—59 |
| 2,330,286 | 9/1943 | Honel | 260—34 |
| 3,027,349 | 3/1962 | Brahr et al. | 260—45.7 |
| 3,003,978 | 10/1961 | Coney et al. | 260—15 |
| 3,019,249 | 1/1962 | Gunderloy | 260—461 |
| 3,121,731 | 2/1964 | Quesnel et al. | 260—461 |
| 3,177,175 | 4/1965 | Barry | 260—33.4 |
| 3,251,785 | 5/1966 | Anderson | 260—2.5 |
| 3,257,337 | 6/1966 | Schoepfle et al. | 260—2.5 |

OTHER REFERENCES

Mellan, The Behaviour of Plasticizers, 1961, TP 247.7 M4, page 259.

WILLIAM H. SHORT, *Primary Examiner.*

H. SCHAIN, *Assistant Examiner.*